Dec. 9, 1969 A. JULLIEN 3,482,672
CONTINUOUS LOADER FOR BULK MATERIAL
Filed July 25, 1966 2 Sheets-Sheet 1
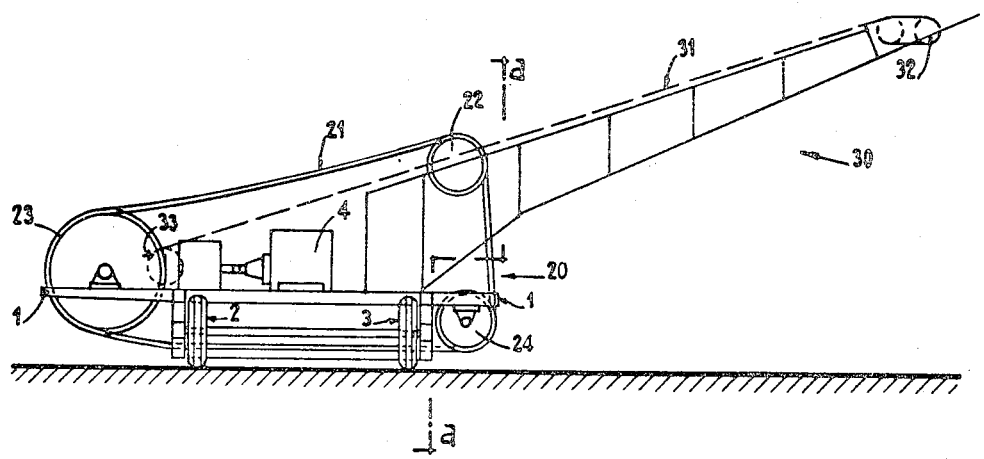
_Fig. 1_
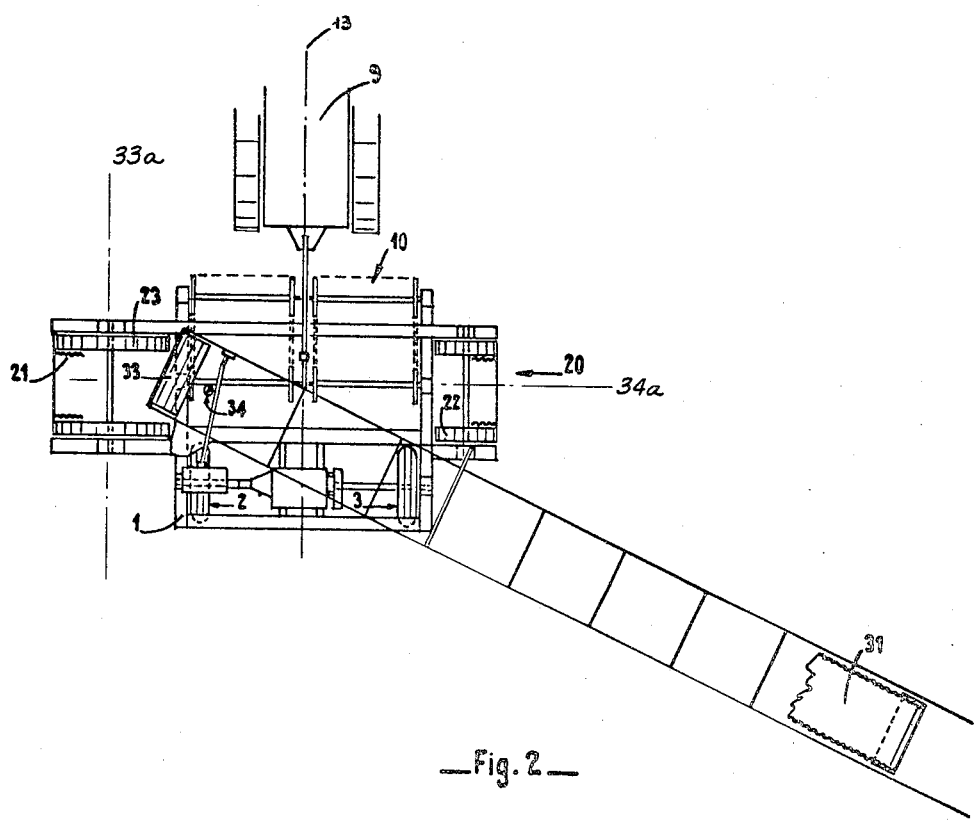
_Fig. 2_

United States Patent Office 3,482,672
Patented Dec. 9, 1969

3,482,672
CONTINUOUS LOADER FOR BULK MATERIAL
Agricol Jullien, Salin-de-Giraud, Bouches-de-Rhone, France, assignor to Compagnie Saliniere de la Camargue "Salicam," Paris, France
Continuation-in-part of application Ser. No. 342,746, Feb. 5, 1964. This application July 25, 1966, Ser. No. 567,717
Claims priority, application France, July 23, 1965, 25,822
Int. Cl. B65g 65/04
U.S. Cl. 198—7                                    6 Claims

ABSTRACT OF THE DISCLOSURE

A continuous loader for bulk material comprising a frame member, a shovel having an upwardly inclined portion with a cutting edge at the lower end, a first conveyor behind the shovel in the form of an endless belt having a horizontally disposed lower portion adjacent the upwardly inclined end portion of the shovel, an ascending concave portion and a horizontally disposed upper portion spaced vertically from the lower portion with means for driving the first conveyor at a linear speed to impart centrifugal force to the material thereon sufficient to overcome gravity whereby the material deposited on the top surface of the lower portion remains on the surface during conveyance through the concave portion to the underside of the upper portion, a second conveyor having a portion located beneath the upper portion of the first conveyor to receive the material falling gravitationally from the bottom side of the upper portion of the first conveyor whereby the material collected by the shovel travels to the first conveyor and from the first conveyor onto the second conveyor for discharge of the material by the second conveyor.

---

This application is a continuation-in-part of my copending application Ser. No. 342,746, filed Feb. 5, 1964, now Patent No. 3,265,222, and entitled "Continuous Loader for Bulk Material."

This invention relates to a loading device for bulk material and particularly to a continuous loading device for soil.

In my copending application Ser. No. 342,746, filed Feb. 5, 1964, entitled "Continuous Loader for Bulk Material," description is made of a continuous bulk material loader mounted on a vehicle and which contains: a shovel operated by a hydraulic jack at the front of the vehicle; a first endless belt conveyor which extends perpendicularly to the axis of movement of the vehicle and is formed with a horizontally disposed lower portion which leads into a central portion having a concave ascending form, the concavity being oriented towards the axial plane of the vehicle and which is operated at a speed sufficiently high to impart centrifugal acceleration to the conveyed material sufficient to overcome the forces of gravity, and a second belt conveyor, slightly inclined with respect to the horizontal, which receives the material raised by the first belt conveyor for lateral displacement.

The loader is preferably mounted on a Caterpillar tractor. It is highly efficient when employed for handling finely divided materials such as salt, from the salt marshes, or sufficiently dry sand. On the other hand, difficulties are encountered when used as earth moving equipment.

The present invention has for its object a loader of the type described embodying improvements to enable use in earth moving operations and for handling other materials.

This and other objects and advantages of this invention will hereinafter appear and for purposes of illustration but not of limitation, an embodiment of the invention is shown in the accompanying drawing in which:

FIG. 1 is a front elevational view of the loader embodying the features of this invention;

FIG. 2 is a top plan view of the loader shown in FIG. 1; and

Figure 3:
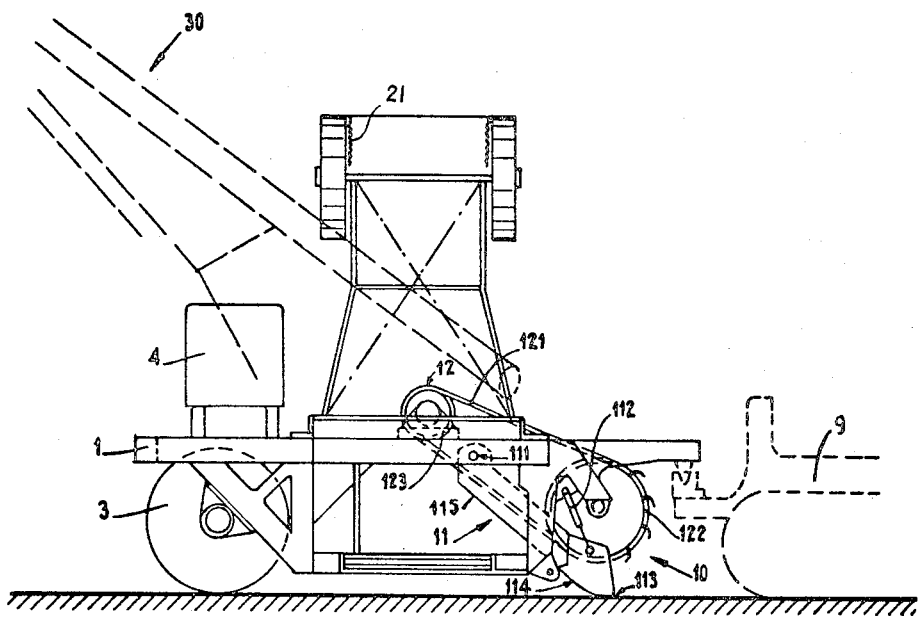
FIG. 3 is a sectional view taken along the line A—A of FIG. 1.

The loader, embodying the features of this invention, comprises a chassis on which the following elements are mounted in assembly: a device mounted on the front of the vehicle for engaging and cutting the soil; a first endless belt conveyor which extends perpendicular to the direction of movement of the chassis and in which the belt is formed with a horizontally disposed lower portion leading into a midsection having a concave ascending form which is displaced at a speed sufficiently high to impart centrifugal acceleration to the conveyed material to overcome the effects of gravity, and a second endless belt conveyor in which the belt is inclined in relation to the horizontal and which receives the material raised by the first conveyor.

When the loader advances, the material is cut, gathered and reduced in size by the cutting device and deposited on the first conveyor, whereby it is raised and allowed to fall gravitationally onto the second conveyor, which delivers it either to a transport vehicle or an embankment or heap alongside the loader.

The second conveyor is preferably mounted for pivotal movement about a vertical axis located in the neighborhood of the vertical plane passing through the horizontal axis of the lower drum of the conveyor.

In accordance with one modification, the digger device engaging and cutting the soil comprises a bucket chain in which the buckets are formed with cutting edges.

In a second modification, the device engaging and cutting the soil comprises a shovel mounted at the front of the chassis with a scraper chain operating above the shovel for engagement with the material received thereon.

With reference now to the drawings, the loader proper is mounted on a chassis 1 supported on wheels 2 and 3. It is driven by the motor 4. In the illustrated modification, the loader is mounted on a semi-trailer drawn by the tractor 9. It will be obvious that the loader can equally well be mounted on a trailer having at least two axles, or on a self-propelled vehicle powered either by the motor 4 or by a separate engine. The engaging and cutting device 10 comprises a shovel 11 and a scraper chain 12. The shovel 11 can be fixed to the frame either rigidly or preferably pivoted thereto for rocking movement about the pivot 111. In the latter instance, its elevation can be regulated by jack 112 pivoted at one end to the frame and at the other end to the back side of the shovel. The shovel has a cutting edge 113 on the front of a receiving portion 114 which leads into an inclined slide 115. The slide 115 actuates the scraper chain 12 which comprises an endless chain 121 trained about a lower drum 122 of large diameter and mounted for free rotational movement and about an upper driven drum 123 of smaller diameter adapted to be operated by the motor.

The first conveyor 20 comprises an endless belt 21 passing over three drums, namely—an upper drum 22, a median drum 23, and a lower drum 24. Drums 22 and 24 are of substantially equal and relatively small diameter while the second drum is formed of larger diameter. The belt extends perpendicular to the axis of movement of the chassis 1. Each of the drums are formed of two laterally spaced apart disc wheels which are linked only by the belt along their periphery. The diameter of the wheels composing the large drum 23 and the speed of linear movement of the belt are calculated so that the centrifugal acceleration imparted to the material transported on the inner run of the belt overcomes the forces of gravity and is therefore carried upwardly by the belt. In the illustrated modification the drum 23 constitutes the drum driven by the motor 4.

The second conveyor 30 comprises an endless belt 31 passing about an upper drum 32 and a lower drum 33 operatively connected to the motor 4 for driving movement. The conveyor is rotatable horizontally about a vertical axis 34 on a pin located in proximity of the vertical plane 34ª passing through the horizontal axis 33ª of the lower drum 33. The belt 31 is inclined in relation to the horizontal and the inclination can advantageously be adjusted.

The appliance functions in the following manner: The cutting edge 113 of the shovel 11 digs a slice from the soil. This material is seized and broken up by the scraper chain 121 spaced a short distance over the surface of the shovel. The material is carried up the incline 115 by the chain and thrown onto the lower section of the belt 21. The speed of the belt is such that when it moves over the drum 23, the material remains pressed against the surface of the belt under the effect of centrifugal force and falls down only on reaching the upper rectilinear portion of the belt. The material falls gravitationally onto the upper surface of the endless belt 31 of the conveyor 30 on which it is carried away.

The engaging and cutting device can be adapted to the nature of the soil with which the appliance has to work. For example, the shovel which extends crosswise for the width of the chassis can be replaced by buckets having a cutting edge in which the buckets are mounted either on an endless chain for emptying their contents directly onto the upper run of the belt 21, or on a wheel. In the latter event the buckets will empty their contents either on a small auxiliary conveyor belt feeding the belt 21 or onto an inclined chute.

I claim:
1. A continuous loader for bulk material comprising a cutting action shovel having a front cutting edge leading into an upwardly inclined portion, a first conveyor in the form of an endless belt mounted behind the shovel and having a substantially horizontally disposed lower portion which moves adjacent to and below the end of the upwardly inclined portion of the shovel and an ascending concave portion as a continuation of the horizontally disposed portion and terminating in a substantially horizontally disposed upper portion spaced above the lower portion, means for driving the first conveyor at a linear speed to impart centrifugal force to the material thereon sufficient to overcome gravity whereby the material deposited on the top surface of the lower portion remains on the surface of the first conveyor during conveyance through the concave portion to the underside of the upper portion, a second conveyor having a portion beneath the upper portion of the first conveyor to receive the material falling gravitationally from the bottom side of the upper portion of the first conveyor whereby the material collected by the shovel can be passed to the first conveyor and then from the first conveyor on to the second conveyor which discharges the material, means for driving the second conveyor, an endless chain adjacent the upper surface of the shovel and cooperating therewith for displacement of the material over the upwardly inclined surface of the shovel and onto the horizontally disposed lower portion of the first conveyor, and means for driving the endless chain.

2. A loader as claimed in claim 1 in which the endless chain extends lengthwise over a width of the shovel and is spaced a short distance from the upper surface of the shovel with an incline corresponding to the upwardly inclined portion of the shovel.

3. A loader as claimed in claim 1 wherein each of the first and second conveyors comprise endless belt conveyors.

4. A loader as claimed in claim 1 in which the second conveyor is inclined upwardly from a point adjacent the end of the first conveyor.

5. A loader as claimed in claim 1 in which the first conveyor is characterized by a concavity in the intermediate portion and which includes a straight portion as a continuation of the upper end of the concave portion with the material passing directly from the concave portion onto the straight portion from which it falls onto the second conveyor.

6. A loader as claimed in claim 1 in which the shovel is mounted for pivotal movement for varying the depth of cut and which includes means for imparting pivotal movement to the shovel.

References Cited

UNITED STATES PATENTS

| | | | |
|---|---|---|---|
| 400,859 | 4/1889 | La Londe | 37—102 |
| 1,475,550 | 11/1923 | Naylor | 37—102 |
| 1,482,904 | 2/1924 | Moore et al. | 37—97 XR |
| 1,754,551 | 4/1930 | Greiman | 37—90 XR |
| 2,791,041 | 5/1957 | Hancock | 37—8 |
| 3,206,877 | 9/1965 | Metailler | 37—90 |
| 3,206,419 | 2/1967 | Palmer et al. | 37—102 XR |

FOREIGN PATENTS

| | | |
|---|---|---|
| 729,516 | 5/1955 | Great Britain. |

ROBERT E. PULFREY, Primary Examiner

C. D. CROWDER, Assistant Examiner

U.S. Cl. X.R.

37—102; 198—128